United States Patent
Chen et al.

(10) Patent No.: US 6,882,753 B2
(45) Date of Patent: Apr. 19, 2005

(54) ADAPTIVE QUANTIZATION USING CODE LENGTH IN IMAGE COMPRESSION

(75) Inventors: Cheng-Hsien Chen, Yung Kang (TW); Chen-Yi Lee, Hsinchu (TW); Lin-Tien Mei, Hsinchu Hsien (TW); Hung-Ta Pai, Taichung Hsien (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 629 days.

(21) Appl. No.: 09/874,559

(22) Filed: Jun. 4, 2001

(65) Prior Publication Data

US 2002/0181795 A1 Dec. 5, 2002

(51) Int. Cl.$^7$ ............................................... G06K 9/46
(52) U.S. Cl. ....................... 382/251; 38/250; 38/246; 38/167; 375/240.24; 375/240.2
(58) Field of Search ................................ 382/165, 166, 382/167, 251, 243, 250, 254, 232, 233, 239, 248, 270, 271, 272, 273, 246; 375/240.12, 240.24, 240.2, 240.15, 240, 240.3; 348/405; 358/1.15

(56) References Cited

U.S. PATENT DOCUMENTS

| | | | | |
|---|---|---|---|---|
| 5,530,478 A | * | 6/1996 | Sasaki et al. | 375/240.04 |
| 5,966,470 A | * | 10/1999 | Miyashita et al. | 382/248 |
| 6,173,012 B1 | * | 1/2001 | Katta et al. | 375/240.15 |
| 2001/0012397 A1 | * | 8/2001 | Kato | 382/166 |
| 2002/0102027 A1 | * | 8/2002 | Miyake et al. | 382/239 |

\* cited by examiner

*Primary Examiner*—Bhavesh M. Mehta
*Assistant Examiner*—Ali Bayat
(74) *Attorney, Agent, or Firm*—Townsend and Townsend and Crew LLP

(57) ABSTRACT

A method is adapted for compressing an image data block, and includes the steps of:
(a) subjecting the image data block to discrete cosine transformation so as to generate discrete cosine transform data;
(b) quantizing the discrete cosine transform data in accordance with a quantizer matrix that consists of an array of quantizing coefficients so as to generate quantized data;
(c) encoding the quantized data using an entropy coding algorithm so as to generate an encoded bitstream; and
(d) when the length of the encoded bitstream does not fall within a predetermined range, adjusting the quantizing coefficients in the quantizer matrix and repeating steps (b) and (c) until the length of the encoded bitstream falls within the predetermined range.

12 Claims, 6 Drawing Sheets

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 2
PRIOR ART

| 16 | 8  | 8  | 16 | 16 | 32  | 64  | 64  |
|----|----|----|----|----|-----|-----|-----|
| 8  | 8  | 16 | 16 | 32 | 64  | 64  | 64  |
| 16 | 16 | 16 | 16 | 32 | 64  | 64  | 64  |
| 16 | 16 | 16 | 32 | 64 | 64  | 64  | 64  |
| 16 | 16 | 32 | 64 | 64 | 128 | 128 | 64  |
| 16 | 32 | 64 | 64 | 64 | 128 | 128 | 64  |
| 64 | 64 | 64 | 64 | 128 | 128 | 128 | 128 |
| 64 | 64 | 64 | 128 | 128 | 128 | 128 | 128 |

| 16 | 8 | 8 | 16 | 16 | 32 | 64 | 64 |
| 8 | 8 | 16 | 16 | 32 | 64 | 64 | 64 |
| 16 | 16 | 16 | 16 | 32 | 64 | 64 | 64 |
| 16 | 16 | 16 | 32 | 64 | 64 | 64 | 64 |
| 16 | 16 | 32 | 64 | 64 | 128 | 128 | 128 |
| 16 | 32 | 64 | 64 | 64 | 128 | 256 | 128 |
| 64 | 64 | 64 | 64 | 128 | 256 | 256 | 256 |
| 64 | 64 | 64 | 128 | 256 | 256 | 256 | 256 |

FIG. 6

| 16 | 8  | 8   | 16  | 16  | 32  | 64  | 64  |
|----|----|-----|-----|-----|-----|-----|-----|
| 8  | 8  | 16  | 16  | 32  | 64  | 64  | 64  |
| 16 | 16 | 16  | 16  | 32  | 64  | 64  | 128 |
| 16 | 16 | 16  | 32  | 64  | 64  | 128 | 128 |
| 16 | 16 | 32  | 64  | 64  | 256 | 256 | 128 |
| 16 | 32 | 64  | 64  | 128 | 256 | 256 | 128 |
| 64 | 64 | 64  | 128 | 256 | 256 | 256 | 256 |
| 64 | 64 | 128 | 256 | 256 | 256 | 256 | 256 |

FIG. 7

| 16 | 4  | 8  | 16  | 16  | 32  | 64  | 64  |
|----|----|----|-----|-----|-----|-----|-----|
| 4  | 8  | 16 | 16  | 32  | 64  | 64  | 64  |
| 16 | 16 | 16 | 16  | 32  | 64  | 64  | 64  |
| 16 | 16 | 16 | 32  | 64  | 64  | 64  | 64  |
| 16 | 16 | 32 | 64  | 64  | 128 | 128 | 64  |
| 16 | 32 | 64 | 64  | 64  | 128 | 128 | 64  |
| 64 | 64 | 64 | 64  | 128 | 128 | 128 | 128 |
| 64 | 64 | 64 | 128 | 128 | 128 | 128 | 128 |

FIG. 8

ADAPTIVE QUANTIZATION USING CODE LENGTH IN IMAGE COMPRESSION

BACKGROUND OF THE INVENTION

1. Field of the Invention

The invention relates to a method for compressing an image data block, more particularly to a method for compressing an image data block that has a relatively low memory and bus bandwidth requirement and that can enhance graphics processing efficiency.

2. Description of the Related Art

In the processing of 3D graphics, texture mapping is a very important technique to be applied to render details in a scene. Many basic or frequently used textures are stored in a memory unit, and can be accessed by a graphics chip to select desired ones for rendering in an appropriate area of a scene to be rendered. A conventional texture accessing process involves a texture processing unit in a graphics chip that can access desired textures from a texture database in a local memory of a memory unit.

However, in 3D graphics, to serve the purpose of making a scene that is vivid and non-monotonous and that achieves natural color rendering, much more memory space is required to store a lot of texture data, and a larger bus bandwidth is required for a texture database. For solving the aforesaid problems, there are first and second algorithms available to compress texture data:

1. JEPG-like algorithms include TREC used in Talisman, and MPEG 2 used in PS 2. The JEPG-like algorithms can achieve high compression ratio with acceptable texture quality. However, the length of an encoded bitstream generated by the JEPG-like algorithms is not fixed. The variance of the lengths of encoded bitstreams can result in waste of the bandwidth and an increase in hardware costs.

2. VQ-like algorithms, such as S3TC and FXTC, are used in compression with high complexity and decompression with low complexity. The unbalanced complexity of the VQ-like algorithms is suitable for texture compression, but the compression ratio thereof is low such that the requirement of the memory and the bus bandwidth cannot be reduced effectively.

SUMMARY OF THE INVENTION

Therefore, an object of the present invention is to provide a method for compressing an image data block that has a relatively low memory and bus bandwidth requirement and can enhance graphics processing efficiency.

According to the present invention, a method is adapted for compressing an image data block, and comprises the steps of:

(a) subjecting the image data block to discrete cosine transformation so as to generate discrete cosine transform data;

(b) quantizing the discrete cosine transform data in accordance with a quantizer matrix that consists of an array of quantizing coefficients so as to generate quantized data;

(c) encoding the quantized data using an entropy coding algorithm so as to generate an encoded bitstream; and (d) when the length of the encoded bitstream does not fall within a predetermined range, adjusting the quantizing coefficients in the quantizer matrix and repeating steps (b) and (c) until the length of the encoded bitstream falls within the predetermined range.

BRIEF DESCRIPTION OF THE DRAWINGS

Other features and advantages of the present invention will become apparent in the following detailed description of the preferred embodiment with reference to the accompanying drawings, of which:

FIG. 2 illustrates a conventional 8×8 quantizer matrix in accordance with JEPG standard;

FIG. 3 illustrates an 8×8 quantizer matrix in accordance with the method of the preferred embodiment;

FIG. 5 is a schematic view showing how the quantizing coefficients in the quantizer matrix are grouped into ten coefficient groups in accordance with the method of the preferred embodiment;

FIG. 6 illustrates the quantizer matrix after upscaling the quantizing coefficients in the tenth coefficient group of FIG. 3 by a factor of 2;

FIG. 7 illustrates the quantizer matrix after upscaling the quantizing coefficients in the ninth coefficient group of FIG. 6 by the factor of 2;

FIG. 8 illustrates the quantizer matrix after downscaling the quantizing coefficients in the first coefficient group of FIG. 3 by the factor of 2.

DETAILED DESCRIPTION OF THE PREFERRED EMBODIMENT

Figure 1:
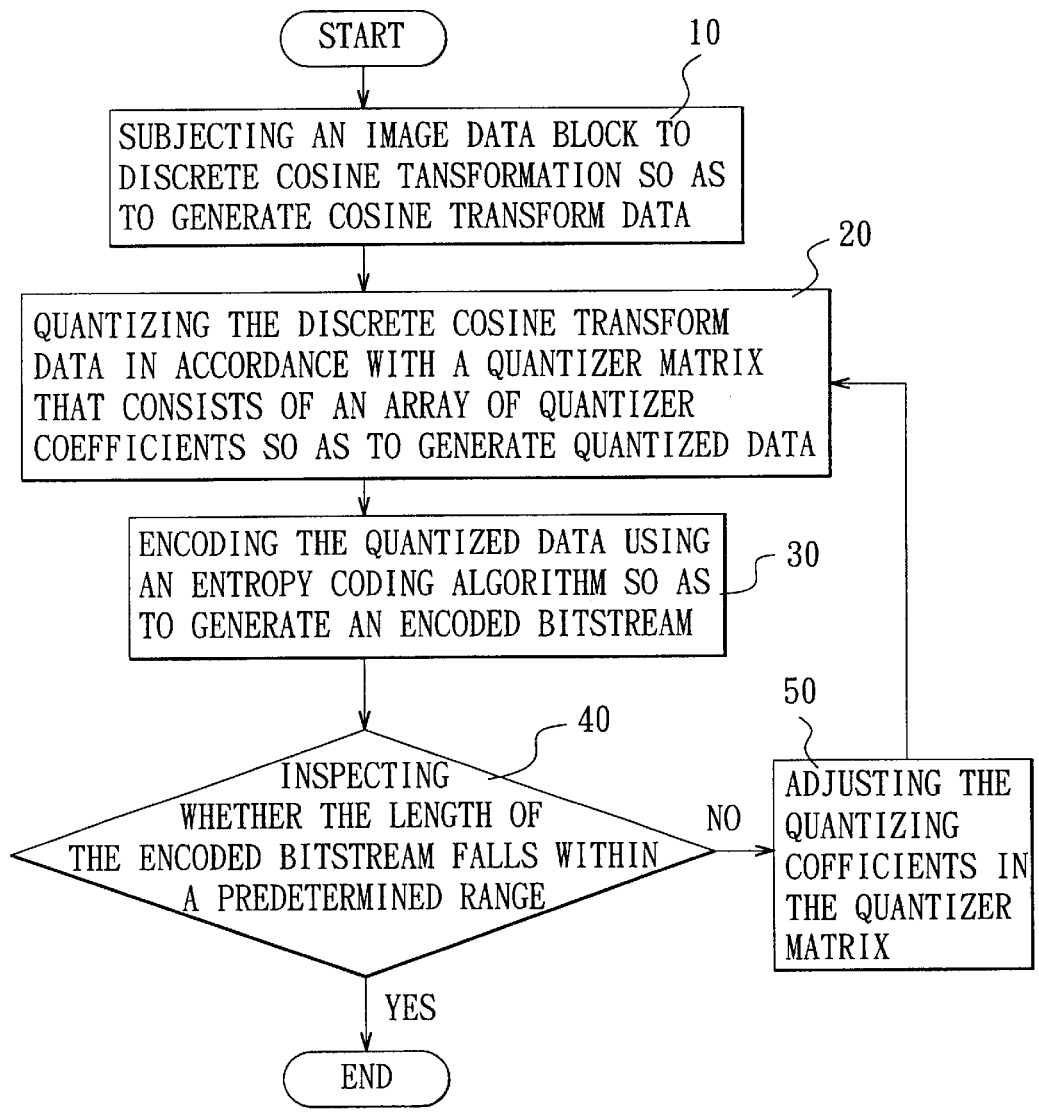
FIG. 1 is a flow chart illustrating the preferred embodiment of a method for compressing an image data block according to this invention.

Referring to FIG. 1, there is shown a flow chart to illustrate the preferred embodiment of a method for compressing an image data block according to the present invention. The image data block can be one of Y, U and V color space image data blocks. In this embodiment, the image data block is Y color space image data block that is 8×8 in size. In step 10, the image data block is subjected to discrete cosine transformation in a known manner so as to generate discrete cosine transform data. In step 20, the discrete cosine transform data are quantized in accordance with a quantizer matrix that consists of an array of quantizing coefficients so as to generate quantized data. The quantizer matrix, as shown in FIG. 3, is modified from a conventional quantizer matrix, as shown in FIG. 2, that is in accordance with the JPEG standard such that each of the quantizing coefficients in the quantizer matrix of FIG. 3 is a power of 2. In step 30, the quantized data are encoded using an entropy coding algorithm so as to generate an encoded bitstream. In this embodiment, the entropy coding algorithm is a variable length coding algorithm, such as a Huffman coding algorithm. In step 40, the length of the encoded bitstream is inspected to determine whether it falls within a predetermined range. In step 50, when the length of the encoded bitstream does not fall within the predetermined range, the quantizing coefficients in the quantizer matrix of FIG. 3 are adjusted, and the flow proceeds back to step 20. Otherwise, the flow is ended.

Figure 4:
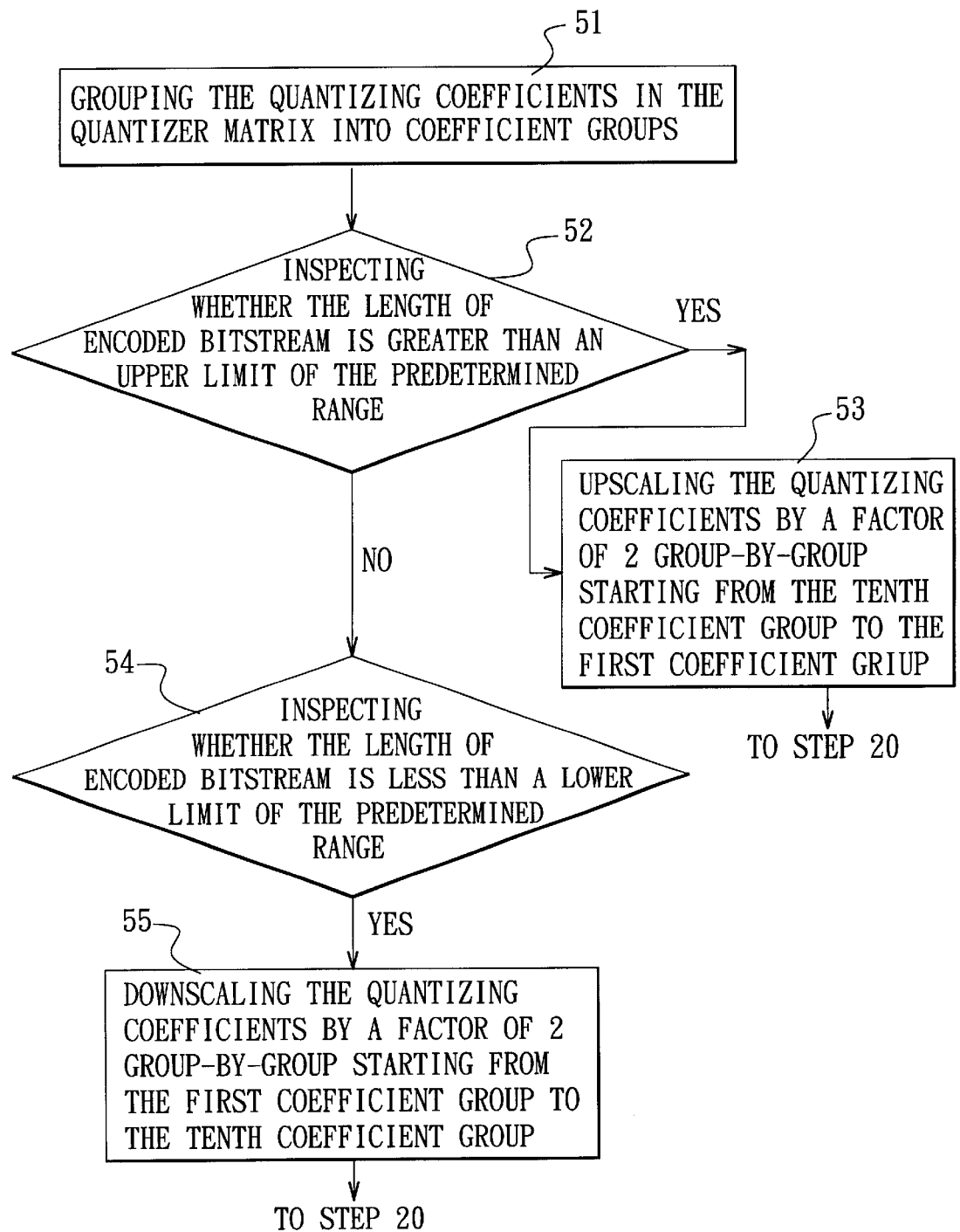
FIG. 4 is a flow chart illustrating how the quantizing coefficients in the quantizer matrix are adjusted in accordance with the method of the preferred embodiment.

Referring to FIG. 4, there is shown a flow chart to illustrate how the quantizing coefficients in the quantizer matrix of FIG. 3 are adjusted when the length of the encoded bitstream does not fall within the predetermined range. In step 51, the quantizing coefficients in the quantizer matrix are grouped into ten coefficient groups, as shown in FIG. 5. The coefficient groups are obtained by dividing the quantizer matrix into diagonally extending sections, and are arranged into lower-ordered groups that include a lowest-ordered group, such as the first coefficient group, and higher-ordered groups that include a highest-ordered group, such as the tenth coefficient group. The number of quantizing coefficients in each of the lower-ordered groups is less than that in each of the higher-ordered groups. In step 52, the length of the encoded bitstream is inspected to determine whether it is greater than an upper limit of the predetermined range. In step 53, when the length of the encoded bitstream is greater than the upper limit of the predetermined range, the quantizing coefficients are upscaled by a factor of 2 group-by-group and one group at a time starting from the tenth coefficient group to the first coefficient group, and the flow goes back to step 20. FIG. 6 illustrates the quantizer matrix of FIG. 3 after upscaling the quantizing coefficients in the tenth coefficient group by the factor of 2. FIG. 7 illustrates the quantizer matrix of FIG. 6 after upscaling the quantizing coefficients in the ninth coefficient group by the factor of 2. The quantizer matrix of FIG. 7 is obtained when the length of the encoded bitstream after quantizing with the quantizer matrix of FIG. 6 and entropy coding is still greater than the upper limit of the predetermined range. In step 54, when the length of the encoded bitstream is not greater than the upper limit of the predetermined range, the length of the encoded bitstream is inspected to determine whether it is less than a lower limit of the predetermined range. In step 55, when the length of the encoded bitstream is less than the lower limit of the predetermined range, the quantizing coefficients are downscaled by a factor of 2 group-by-group and one group at a time starting from the first coefficient group to the tenth coefficient group, and the flow goes back to step 20. FIG. 8 illustrates the quantizer matrix of FIG. 3 after downscaling the quantizing coefficients in the first coefficient group by the factor of 2.

Figure 9:
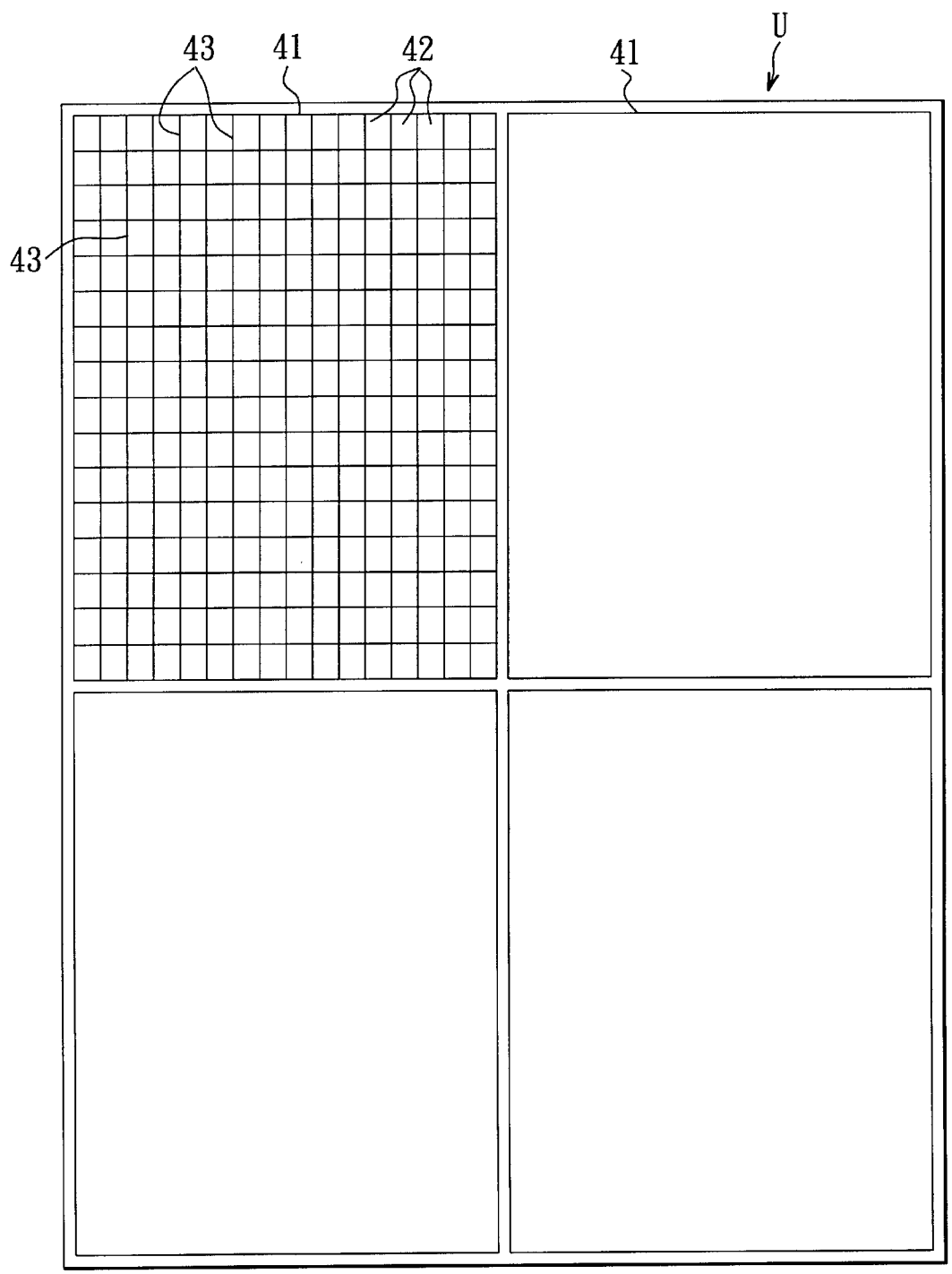
FIG. 9 is a schematic view of a U color space image data block that is to be compressed in accordance with the method of the preferred embodiment.

As mentioned hereinbefore, the U and V color space image data blocks can also be compressed by the method of this invention. Referring to FIG. 9, when the image data block is the U or V color space image data block, in view of the lower resolution requirement for U and V color space data, the image data block can be obtained by averaging adjacent discrete data in an initial image data block (U) that is 32×32 in size to obtain the image data block that is 8×8 in size. Particularly, the initial image data block (U) is divided into four sub-blocks 41, each of which is 16×16 in size. Each of the sub-blocks 41 is further divided into 8*8 small blocks 43, each of which includes 2*2 block units 42. The adjacent discrete data in the small blocks 43 of each sub-block 41 are averaged so as to obtain an averaged sub-block that is 8×8 in size and that serves as the U or V color space image data block.

When decompressing the image data block, entropy decoding is first performed, followed by retrieval of the quantizing coefficients in the quantizer matrix for regeneration of the discrete cosine transform data. Thereafter, inverse discrete cosine transformation (IDCT) is performed in a known manner so as to obtain the original data. Since the specific configuration of a device for decompressing image data blocks is known in the art, a detailed description of the same will be omitted herein for the sake of brevity.

Therefore, the method of this invention can be used to compress image data blocks into multiple data files with substantially the same size. Since the data files can be stored in an orderly manner in a memory unit, a selected one of the data files stored in the memory unit can be quickly retrieved and transported to a graphics chip via a bus. It is noted that, according to the method of this invention, the image data blocks of Y, U and V color space can be compressed into a plurality of compressed files with substantially the same size, thereby resulting in a lower memory and bus bandwidth requirement and enhanced graphics processing efficiency.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for compressing an image data block, comprising the steps of:
   (a) subjecting the image data block to discrete cosine transformation so as to generate discrete cosine transform data;
   (b) quantizing the discrete cosine transform data in accordance with a quantizer matrix that consists of an array of quantizing coefficients so as to generate quantized data, wherein each of the quantizing coefficients in the quantizer matrix is a power of 2;
   (c) encoding the quantized data using an entropy coding algorithm so as to generate an encoded bitstream; and
   (d) when the length of the encoded bitstream does not fall within a predetermined range, adjusting the quantizing coefficients in the quantizer matrix and repeating steps (b) and (c) until the length of the encoded bitstream falls within the predetermined range, wherein step (d) includes:
   (d-1) grouping the quantizing coefficients in said quantizer matrix into a plurality of coefficient groups, the coefficient groups being arranged into lower-ordered groups that include a lowest-ordered group, and higher-ordered groups that include a highest-ordered group, the number of quantizing coefficients in each of the lower-ordered groups being less than that in each of the higher-ordered groups; and
   (d-2) adjusting the quantizing coefficients in one of said coefficient groups according to the length of the encoded bitstream, wherein:
   the quantizing coefficients are unscaled by a factor of 2 group-by-group starting from the highest-ordered group to the lowest-ordered group whenever the length of the encoded bitstream is greater than an upper limit of the predetermined range; and
   the quantizing coefficients are downscaled by a factor of 2 group-by-group starting from the lowest-ordered group to the highest-ordered group whenever the length of the encoded bitstream is less than a lower limit of the predetermined range.

2. The method as claimed in claim 1, wherein the image data block is $2^n \times 2^n$ in size, n being a positive integer.

3. The method as claimed in claim 2 wherein the image data block is one of Y, U and V color space image data blocks.

4. The method as claimed in claim 3 wherein the image data block is one of the U and V color space image data blocks, and is obtained by averaging adjacent discrete data in an initial image data block that is $2^{2+n} \times 2^{2+n}$ in size to obtain the image data block that is $2^n \times 2^n$ in size.

5. The method as claimed in claim 1, wherein the entropy coding algorithm is a variable length coding algorithm.

6. The method as claimed in claim 5 wherein the variable length coding algorithm is a Huffman coding algorithm.

7. A method for compressing an image data block, comprising the steps of:
(a) subjecting the image data block to discrete cosine transformation so as to generate discrete cosine transform data;
(b) quantizing the discrete cosine transform data in accordance with a quantizer matrix that consists of an array of quantizing coefficients so as to generate quantized data;
(c) encoding the quantized data using an entropy coding algorithm so as to generate an encoded bitstream; and
(d) when the length of the encoded bitstream does not fall within a predetermined range, adjusting the quantizing coefficients in the quantizer matrix and repeating steps (b) and (c) until the length of the encoded bitstream falls within the predetermined range;
wherein the image data block is $2^n \times 2^n$ in size, n being a positive integer; and
wherein the image data block is one of the U and V color space image data blocks, and is obtained by averaging adjacent discrete data in an initial image data block that is $2^{2+n} \times 2^{2+n}$ in size to obtain the image data block that is $2^n \times 2^n$ in size.

8. The method as claimed in claim 7 wherein step (d) includes the sub-steps of:
(d-1) grouping the quantizing coefficients in said quantizer matrix into a plurality of coefficient groups; and
(d-2) adjusting the quantizing coefficients in one of said coefficient groups according to the length of the encoded bitstream.

9. The method as claimed in claim 8, wherein, in sub-step (d-1), the coefficient groups are arranged into lower-ordered groups that include a lowest-ordered group, and higher-ordered groups that include a highest-ordered group, the number of quantizing coefficients in each of the lower-ordered groups being less than that in each of the higher-ordered groups.

10. The method as claimed in claim 9, wherein each of the quantizing coefficients in the quantizer matrix is a power of 2.

11. The method as claimed in claim 10 wherein, in sub-step (d-2):
the quantizing coefficients are upscaled by a factor of 2 group-by-group starting from the highest-ordered group to the lowest-ordered group whenever the length of the encoded bitstream is greater than an upper limit of the predetermined range; and
the quantizing coefficients are downscaled by a factor of 2 group-by-group starting from the lowest-ordered group to the highest-ordered group whenever the length of the encoded bitstream is less than a lower limit of the predetermined range.

12. The method as claimed in claim 9 wherein the coefficient groups are obtained by dividing the quantizer matrix into diagonally extending sections.

* * * * *